Nov. 6, 1945.  G. A. REINHARD  2,388,498
DIRECT CURRENT MOTOR
Filed July 27, 1942
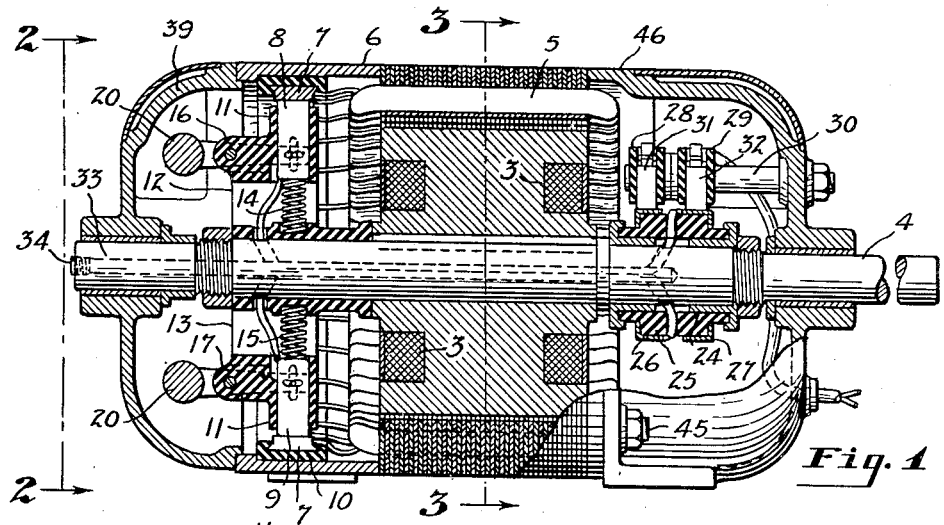
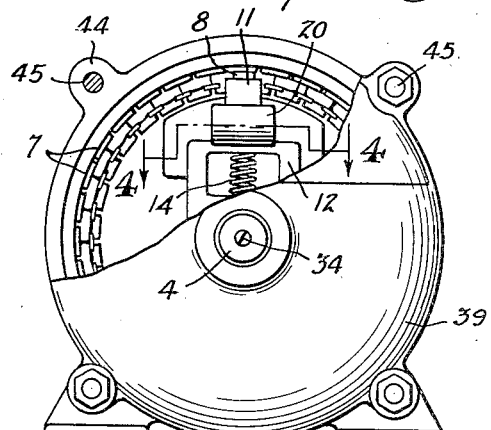
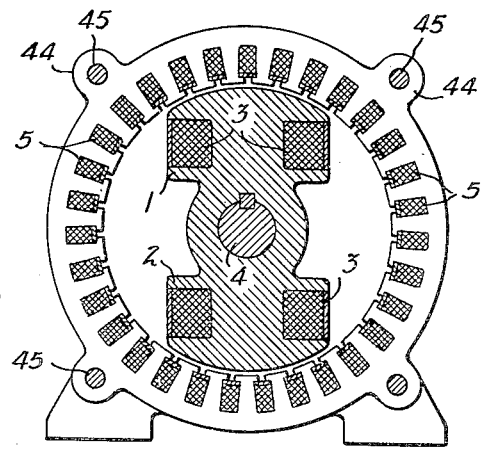
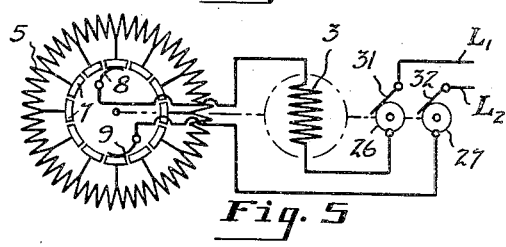
INVENTOR
Gustav A. Reinhard
BY John Mahoney
ATTORNEY Patented Nov. 6, 1945

2,388,498

UNITED STATES PATENT OFFICE 2,388,498

DIRECT-CURRENT MOTOR

Gustav A. Reinhard, Shaker Heights, Ohio, assignor to Kohl-Stilwell Engineers, Cleveland, Ohio, a firm composed of Everard F. Kohl and William E. Stilwell, Jr.

Application July 27, 1942, Serial No. 452,427

8 Claims. (Cl. 172—36)

My invention relates to direct current motors and more particularly to an improved direct current motor which is adapted to be rotated at comparatively high speeds.

The speed at which ordinary direct current motors may be operated is limited by the heat developed in the armature windings, the action of the brushes and commutator, and the strains to which the mechanical parts are subjected. When direct current motors are utilized in association with apparatus requiring high motor speed, such as for starting the engines of aircraft structure, the motor overheats and the commutator and other mechanical parts are unable to resist the strains to which they are subjected in service, thereby causing disintegration of the motor parts. Various means have been suggested to overcome this deficiency, such as by providing means for limiting the speed of the motor but such governors have not proven entirely satisfactory in service.

It is the purpose of the present invention to provide an improved direct current motor which can be operated at high speeds without mechanical injury to its parts and in which the heat developed is considerably less than in conventional direct current motors. The dimensions of the motor may therefore be made smaller for the same torque than ordinary direct current motors. My improved motor is also easier to wind and to balance mechanically than conventional direct current motors.

It is therefore an object of my invention to provide a direct current motor which may be made smaller for the same torque than ordinary direct current motors and which is capable of high speed operation.

Another object of my invention is to provide a direct current motor which is easier to wind and balance mechanically and from which the heat may be dissipated much more readily than from conventional direct current motors and which may therefore be operated at comparatively high speeds in service.

My invention will be better understood by reference to the accompanying drawing in which:

Fig. 1 is a longitudinal sectional view of my improved motor;

Fig. 2 is an end view of the motor shown in Fig. 1 as viewed from a plane passing through the line 2—2, with parts broken away to show adjacent structure;

Fig. 3 is a cross sectional view on the line 3—3 of Fig. 1;

Fig. 4 is a cross sectional view on the line 4—4 of Fig. 2;

Fig. 5 is a wiring diagram showing the electrical connections to the parts of the motor when the motor is of the series type;

Fig. 6 is a diagram similar to that shown in Fig. 5 when the motor is of the shunt-wound type; and Fig. 7 is a diagrammatical view of a modified form of rotor, showing a series field winding arranged in axial slots around the periphery of the rotor.

While my improved motor may be provided with any desirable number of poles and the armature windings may be of the series or multiple circuit type as in the conventional direct current motor construction, as illustrated in the drawing, a rotor is shown including poles 1 and 2 formed of magnetic material, which if desired, may be laminated, and which carry the field windings 3. The rotor is splined or otherwise attached to the motor shaft 4, and the armature or stator coils 5, which are embedded in slots in a laminated magnetic frame or core 6 surrounding the poles, are electrically connected to stationary commutator bars 7 in such a manner that current flows in the armature coils when brushes 8 and 9 carried by the shaft and rotatable therewith bear on the commutator bars and are connected to an input circuit. While the armature coils may be of any desired type that is suitable in conventional direct current motors and may be connected to the commutator bars in multiple or in series, for purposes of illustration, they are shown diagrammatically in Figs. 5 and 6 as a conventional two pole type.

By placing the field windings upon the rotating element and embedding the armature or stator coils, which require more room than the field windings, in the larger area provided by the slots in the frame or core surrounding the poles, the dimensions of my improved motor may be made smaller for the same torque than conventional direct current motors and it is therefore much more suitable for use in association with aircraft than the ordinary direct current motor.

As is well known, in conventional direct current motors, the armature core must be of a specified size to dissipate the heat and to keep the flux density in the teeth at the proper value when a predetermined torque is required. This is true because the amount of copper necessary for conducting the load current is the determining factor in choosing the dimensions of the slot and the exposed surface of the windings determine the amount of watts that can be dissipated for an armature of a definite size. The size of the slots, however, cannot be increased to such an extent that an insufficient amount of laminated iron or sheet steel remains in the teeth to keep the flux density at their proper value, and it is therefore necessary to provide an armature of a predetermined size to provide a predetermined torque. In the field winding of the conventional direct current motor, however, no difficulty has been experienced in dissipating the heat even though the field is stationary.

In my improved motor, the field winding is placed upon poles 1 and 2 which rotate with the motor shaft and consequently the heat developed is readily dissipated during the rotation of the shaft. The poles also act as ventilators which drive air in contact with the stationary armature coils embedded in the frame or core of the machine. This factor, together with the fact that the stationary armature coils have a much greater radiating area than in ordinary direct current motors, enables the armature coils to be made heavier than in ordinary motor construction. It will therefore be apparent that for the same torque my improved motor may be made smaller than conventional direct current motors.

In addition to providing a smaller motor for the same torque, my improved motor may be wound more easily and it is easier to provide a dynamic balance than in ordinary direct current motors. In the rotating armature of the conventional motor, and particularly of the two pole construction, difficulty is encountered in winding the armature because each individual winding has a relatively long span and its end connections are large and bulky. It has accordingly been the practice to machine wind the armature in order to force the coils into the slots, and even after they are forced in place, they never have exactly the same shape so that it is difficult to obtain a dynamic balance and this disadvantage is difficult to correct because there are very few places on the armature to which counterbalancing weights may be attached. When rotating poles are provided, however, there is no difficulty in dynamically balancing the rotor because the field coils are smaller than the armature coils and may be easily wound in place.

In my improved structure, it is also easier to wind the armature coils into the stationary slots formed in the core or frame where plenty of space may be provided for them than to crowd them into the limited slots provided in an armature.

As illustrated in the drawing, the commutator bars 7 are insulated from each other and molded in insulating material 10, such as Bakelite, which may be secured in place by frictional engagement with the frame, and the brushes 8 and 9 which are formed of a conductive material, such as copper or carbon, are slidable in brush holders 11 mounted on brackets 12 and 13 secured to the shaft and are normally forced into engagement with the commutator by means of springs 14 and 15, respectively, the opposite ends of each of which springs fit in a recess formed in the shaft.

To prevent too great pressure of the brushes upon the commutator due to centrifugal force during the rotation of the shaft, brackets 12 and 13 are provided with lugs 16 and 17, respectively, as illustrated more particularly in Fig. 4, to each of which lugs side arms 18 and 19 carrying a weight 20 are pivotally mounted by means of a pin 21 extending through the lug and side arms.

The opposite ends of arms 18 and 19 are apertured to receive the projecting ends of pins 22 which extend through brushes 8 and 9.

Pin 22 is movable in slots formed in the opposite side of each brush holder. In the arrangement shown, it will be apparent that when the shaft 4 is at rest, springs 14 and 15 maintain the brushes in slidable contact with the commutator bars. When the shaft rotates at high speed, however, the brushes have the tendency to be thrown outwardly by centrifugal force which, if uncontrolled, might provide too much pressure of the brushes upon the commutator. In my improved motor, however, the weights 20 are also thrown outwardly by centrifugal force and arms 18 and 19 engage pin 22 and prevent too much pressure of the brushes upon the commutator and consequently the brushes are maintained in engagement with the commutator under a substantially uniform pressure at all speeds.

The fact that the commutator in my improved motor is stationary is another factor which enables the motor to be operated at higher speed than ordinary motors. In a conventional direct current motor, unless extreme care is exercised in constructing, baking and spinning the commutator, some of the bars may be thrown outwardly when the commutator is rotated at high speed. In my improved structure, however, the commutator is stationary and the danger of bars being thrown out of alinement by centrifugal force is eliminated.

Although various means may be provided for supplying current to the field winding and brushes, as illustrated in the drawing, the shaft 4 is provided with sleeves 24 having opposed annular grooves at their ends to receive the ends of an annular insulating sleeve 25 provided with an enlarged annular central portion upon which spaced conducting slip rings 26 and 27 are supported. Arranged above the rings is a pair of brush holders 28 and 29 which are supported by means of a stud 30 affixed to and extending inwardly from one end of the frame. Brushes 31 and 32 are slidably maintained in brush holders 28 and 29 and their inner ends bear upon slip rings 26 and 27.

As illustrated diagrammatically in Fig. 5, current is conducted from line $L_1$ to brush 31 and from slip ring 26 to field coils 3 and brush 8 and from thence through the armature coils to brush 9 from which it returns to line $L_2$ through ring 27 and brush 32. While the conductive wires may be connected to the brushes in any suitable manner, as illustrated in the drawing, they lead to and from the brushes through a bore 33 formed in the shaft 4, the open end of which is plugged as indicated by the numeral 34.

While as indicated diagrammatically in Fig. 5, my improved motor may be of the series type, it is also apparent that it may be provided with a compound or shunt type of field winding. For instance, in Fig. 6 of the drawing, a shunt field winding is diagrammatically shown. The motor in Fig. 6 is similar to that shown in Fig. 5 with the exception that an additional brush 35 and slip ring 36 are provided to conduct current to the field winding. In this type of motor a resistor, as indicated by the numeral 37, is preferably provided to control the amount of current supplied to the field coils.

In Fig. 7 of the drawing, a modified form of rotor is shown. In this modification, instead of providing a pair of poles as shown in Fig. 3, a series of longitudinal slots 38 are formed in the periphery of the rotor and the field windings are embedded in the slots, thus formed. The rotor is preferably formed of laminated magnetic material and the teeth 38a function as poles to receive the magnetic flux. By utilizing a rotor of the type shown in Fig. 7, a better distribution of the flux may be obtained than in the rotor shown in Fig. 3 and the flux distribution may be readily changed by changing the windings.

To provide access for welding leads from conductors 5 to the commutator bars, the end bell 39 of the casing is removable and is provided with apertured ears 44, and the assembled structure, including the laminated magnetic portion, is held in place by means of bolts 45 passing through apertured ears 44 on end bell 39 and similar apertured ears on end bell 46.

The operation of my improved motor is similar to the conventional direct current motor. When current is conducted from line $L_1$ to field 3 and brush 8, a current is established in each of the armature coils as the brush revolves and a magnetic flux is established between the yoke and poles which rotates the pole pieces and shaft 4 with a force depending upon the field flux and the flux set up by the armature windings. In other words, the flux causes rotation of the shaft and provides useful torque in the same manner as when the brushes remain stationary and the coils in the armature are rotated.

What I claim is:

1. A dynamo-electric machine of the series type comprising a casing having a cylindrical portion, a core, stationary armature coils associated with said core, a rotor including a shaft, said rotor having poles arranged in close proximity to said core and carrying field windings, a stationary commutator arranged around the inner periphery of the cylindrical portion of said casing, a pair of conductive brushes rotatable with said shaft and slidably engaging said commutator, and means for supplying electrical energy from a direct current source to said brushes including a circuit in which one of said brushes is in series with said field windings and said commutator being electrically connected to said armature coils to produce a flux between said core and poles during the rotation of said shaft.

2. A dynamo-electric machine comprising a casing having a cylindrical portion, part of which constitutes a core, stationary armature coils associated with said core, a rotor including a shaft, said rotor having poles arranged in close proximity to said core and carrying field windings, a stationary commutator arranged around the inner periphery of the cylindrical portion of said casing, a pair of conductive brushes carried by said shaft, means for yieldingly forcing said brushes into engagement with said commutator at low and high speed, means for supplying electrical energy to said coils through said brushes and electrical energy to said windings to produce a magnetic flux between said core and poles, said commutator being electrically connected to the armature coils during the rotation of said shaft to produce torque for driving said rotor and centrifugally-developed means for preventing excessive pressure of said brushes upon said commutator due to centrifugal force during the rotation of said shaft at high speed.

3. A dynamo-electric machine comprising a casing having a cylindrical portion, a core having stationary armature coils associated therewith, a rotor including a shaft, said rotor having poles arranged in proximity to said core and carrying field windings, a stationary commutator arranged around the inner periphery of the cylindrical portion of said casing, a pair of conductive brushes carried by said shaft, means for yieldingly forcing said brushes into engagement with said commutator when said motor is being operated at low and high speeds, means for supplying electrical energy to said coils through said brushes and electrical energy to said windings to produce a magnetic flux between said core and poles, and said commutator being electrically connected to the armature coils to provide current to each of the armature coils during the rotation of said shaft to produce torque for driving said rotor.

4. A dynamo-electric machine comprising a casing having a cylindrical portion, a core having stationary armature coils associated therewith, a rotor including a shaft having its opposite ends supported in bearings in the opposite ends of said casing with one end of said shaft extending beyond the casing, said rotor having field providing poles arranged in proximity to said core, a stationary commutator arranged around the inner periphery of the cylindrical portion of said casing, conductive brushes carried by said shaft, means for yieldingly forcing said brushes into engagement with said commutator when said motor is being operated at low and high speeds, means for supplying electrical energy to said coils through said brushes to produce a magnetic flux between said core and poles, and said commutator being electrically connected to the armature coils to provide current to each of the armature coils during the rotation of said shaft to produce torque for driving said rotor.

5. A dynamo-electric machine comprising a casing having a cylindrical portion, part of which constitutes a core, stationary armature coils associated with said core, a rotor including a shaft, said rotor having poles arranged in proximity to said core and carrying field windings, a stationary commutator arranged around the inner periphery of the cylindrical portion of said casing, brush holders carried by said shaft, a brush slidably mounted in each of said brush holders, resilient means associated with each of said brushes, each of said resilient means having one end abutting against said shaft and the other end engaging the inner end of one of said brushes to maintain each of said brushes in engagement with said commutator at low and high speeds, and said commutator being electrically connected to the armature coils during rotation of said shaft to produce torque for driving said rotor.

6. A dynamo-electric machine comprising a casing having a cylindrical portion, part of which constitutes a core, stationary armature coils associated with said core, a rotor including a shaft, said rotor having poles arranged in proximity to said core and carrying field windings, a stationary commutator arranged around the inner periphery of the cylindrical portion of said casing, brush holders carried by said shaft, a brush slidably mounted in each of said brush holders, resilient means associated with each of said brushes, each of said resilient means having one end abutting against said shaft and the other end engaging the inner end of one of said brushes to maintain each of said brushes in engagement with said commutator at low and high speeds, said commutator being electrically connected to the armature coils during the rotation of said shaft to produce torque for driving said rotor, and centrifugally developed means for preventing excessive pressure of said brushes upon said commutator during the rotation of said shaft at high speed.

7. A dynamo-electric machine comprising a casing including a core, stationary armature coils associated with said core, a rotor including a shaft, said rotor having field providing poles arranged in proximity to said core, a stationary commutator, a pair of conductive brushes rotatable with said shaft, means for forcing said brushes into engagement with said commutator at all speeds at a substantially uniform pressure including centrifugally-developed means for preventing excessive pressure of said brushes upon said commutator at high speeds during the rotation of said shaft, means for supplying electrical energy to said coils through said brushes to produce a magnetic flux between said core and said poles, and said commutator being electrically connected to the armature coils to produce torque for driving said rotor.

8. A dynamo-electric machine comprising a casing including a core, stationary armature coils associated with said core, a rotor including a shaft, said rotor having field providing poles arranged in proximity to said core, a stationary commutator, a pair of conductive brushes rotatable with said shaft, means whereby said brushes are forced into engagement with said commutator at a substantially uniform pressure at all speeds, including resilient means for forcing the brushes into engagement with the commutator at low speeds and centrifugally-developed means for preventing excessive pressure of said brushes upon said commutator at high speeds during the rotation of said shaft, means for supplying electrical energy to said coils through said brushes to produce a magnetic flux between said core and said poles, and said commutator being electrically connected to the armature coils to produce torque for driving said rotor.

GUSTAV A. REINHARD.